Oct. 14, 1947.  R. G. GILLE ET AL  2,428,934
AIRPLANE HAVING ADJUSTABLE WINGS AND WING ADJUSTING MEANS
Filed Oct. 13, 1941  2 Sheets-Sheet 1

Raymond G. Gille
Harold K. Bourquin
INVENTOR

BY Robert M. Dunning
ATTORNEY

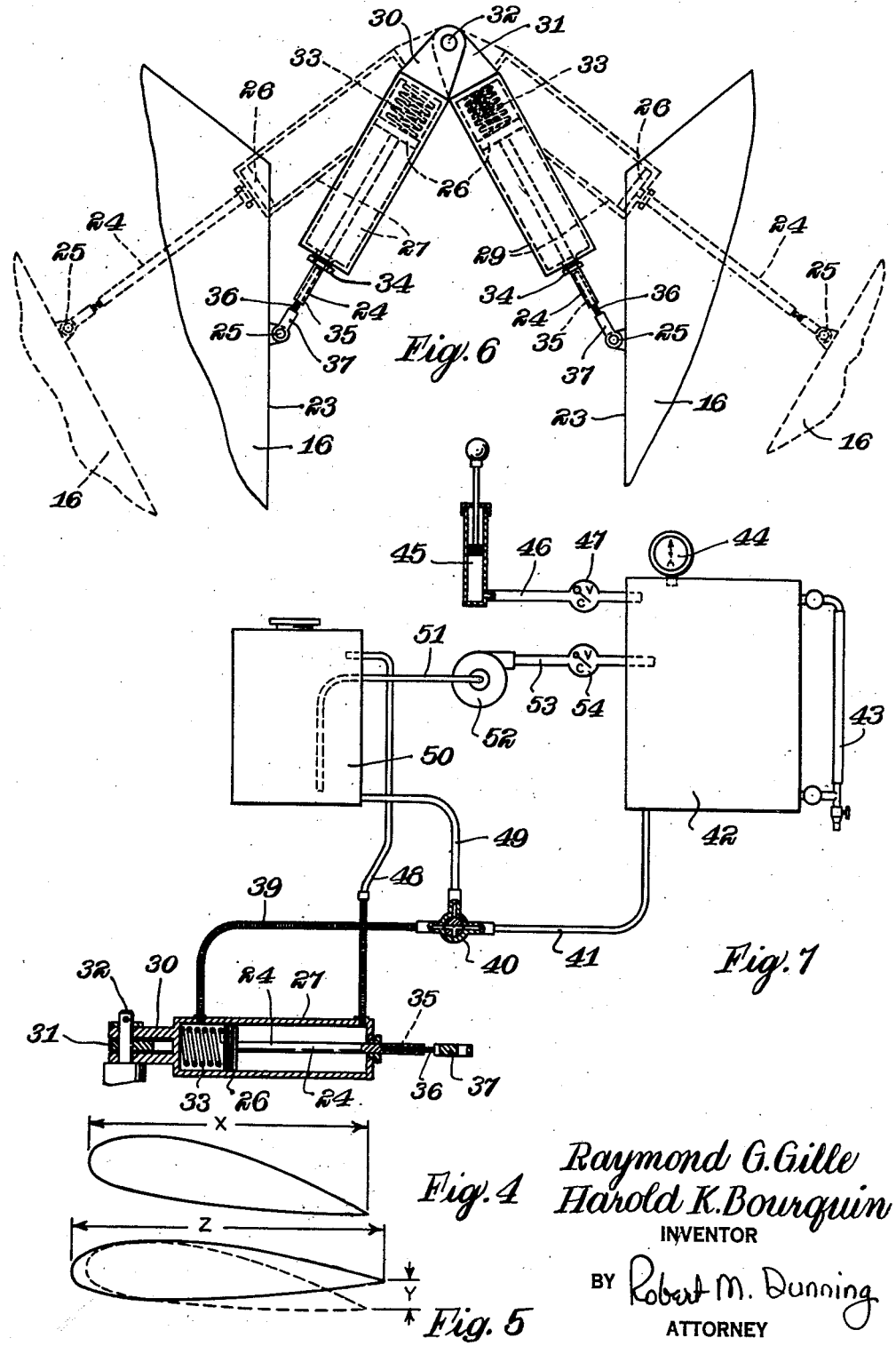

Patented Oct. 14, 1947

2,428,934

UNITED STATES PATENT OFFICE 2,428,934

AIRPLANE HAVING ADJUSTABLE WINGS AND WING ADJUSTING MEANS

Raymond G. Gille and Harold K. Bourquin, St. Paul, Minn.

Application October 13, 1941, Serial No. 414,702

4 Claims. (Cl. 244—46)

Our invention relates to an improvement in airplane, wherein it is desired to provide an airplane design which will function efficiently at varying speeds and under varying flying conditions.

In the design of a modern airplane, the shape of the airfoil section of each wing is controlled by the shape, size, and speed of the plane, as well as by the rate of climb necessary and the power used to propel the plane. There are certain limits within which the shape of the wings may be varied. Through the use of a high lift camber, and by increasing the angle of incidence of the wings, the rate of climb may be increased. Forward speed is necessarily sacrificed in such a design. By decreasing the angle of incidence, and by use of a lower lift camber, the speed of the plane may be increased, but a high rate of climb is sacrificed.

It is the object of the present invention to provide a plane construction in which the wing camber, and the angle of incidence, vary with the speed of the plane, thus reducing the drag of the airplane wings when the airplane is travelling above or below a predetermined speed. In the usual plane, the wing camber and the angle of incidence are designed to create a minimum drag at a certain speed. If the airplane must climb at a high rate of speed, it has been essential that the angle of incidence be relatively high, and that the wing possess a high lift camber. Such a design creates excessive drag at high forward speeds. Similarly, if the plane is designed primarily for speed, the angle of incidence is decreased and the camber is designed for lower lift; rendering difficult the lifting of the plane from the ground and rendering the wings inefficient at climbing speeds.

It is an object of the present invention to provide an airplane having wings which are designed to provide a relatively high lift camber and which are set at an angle of incidence which will permit the plane to climb at a relatively high rate. These wings are supported in a manner to pivot with respect to the fuselage of the plane. This pivotal attachment is such that as the wings are pivoted, the camber of the wings changes toward a relatively low lift camber. Simultaneously, the angle of incidence decreases toward zero; thus decreasing the drag upon the wings as the speed of the airplane increases.

It is a feature of the present invention that the camber of the wings will vary with the forward speed of the plane so that the drag upon the wings will not be excessive at any speed. When climbing, the wing section is relatively shorter in comparison to its maximum ordinate. When at maximum forward speed, the wing section is relatively longer in comparison to its maximum ordinate. Thus the camber of the wings varies in such a manner that the wings create a minimum amount of drag at any rate of speed.

A further feature of the present invention resides in the fact that the angle of incidence of the wings decreases as the forward speed increases. The wings are secured to the fuselage in a manner to provide a dihedral angle. When the wings are pivoted to their extreme forward position, an airfoil section through the wing parallel to the longitudinal axis of the plane is at its maximum angle of incidence. As the wing tips swing rearwardly, the airfoil section lengthens, as it cuts in a slightly diagonal direction through the wing. This action positions each point on the leading edge of the wing directly in front of a point on the trailing edge of the wing closer to the wing tip than before this pivotal action. As a result, a higher point on the trailing edge of the wing is positioned to the rear of each point on the leading edge of the wing, due to the dihedral angle of the wings. Thus, not only is the camber of each wing varied; but also the angle of incidence is decreased toward, or through, zero. Not only is the camber of the pivoted wing more favorable to high speeds; but also the angle of incidence of the pivoted wing is changed to create less drag.

A further feature of the present invention lies in the provision of an automatic control of wing camber and angle of incidence. When the forward speed of the airplane is relatively low, there is less pressure against the leading edges of the wings, and the wings remain at their maximum angle of incidence and highest camber. As the forward speed of the airplane increases, forcing the wings rearwardly in a manner to decrease the angle of incidence, and vary the camber. Means is provided, however, for manually controlling the wings when the automatic control feature is not desired.

These and other objects and novel features of our invention will be more clearly and fully set forth in the following specification and claims.

In the drawings forming a part of our invention:

Figure 4 is an airfoil section taken on a vertical plane parallel to the longitudinal axis of the airplane when the airplane wings are in normal position.

Figure 5 is a sectional view through a wing of the plane at the same point on the leading edge of the wing as section 4, showing the elongation of the airfoil, and the change in the angle of incidence due to the folding of the wing.

Figure 6 is a diagrammatic top plan view through the mechanism for folding or pivoting the wings.

Figure 7 is a diagrammatic view of the control mechanism for the wing operating mechanism.

Figure 1:
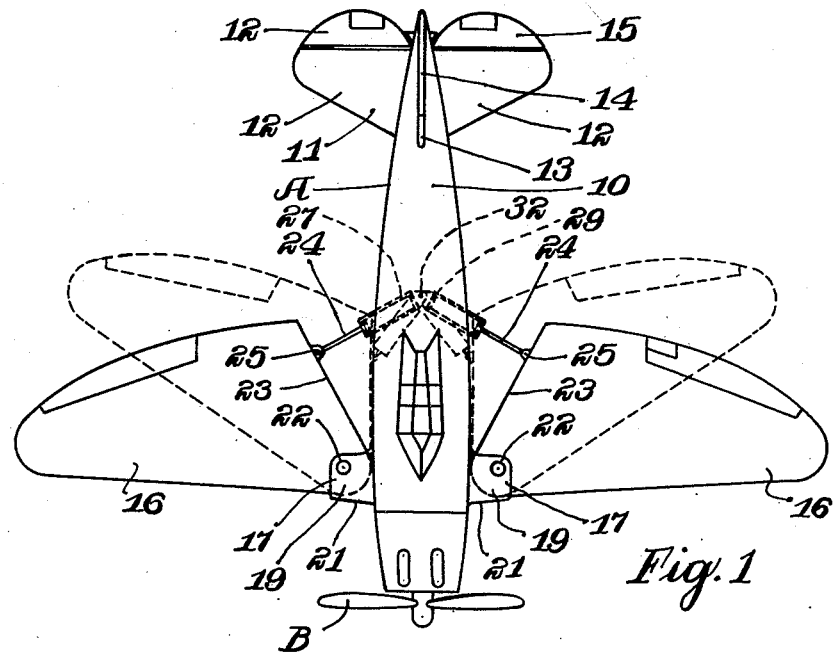
Figure 1 is a top plan view of an airplane embodying our new construction.
Figure 2:
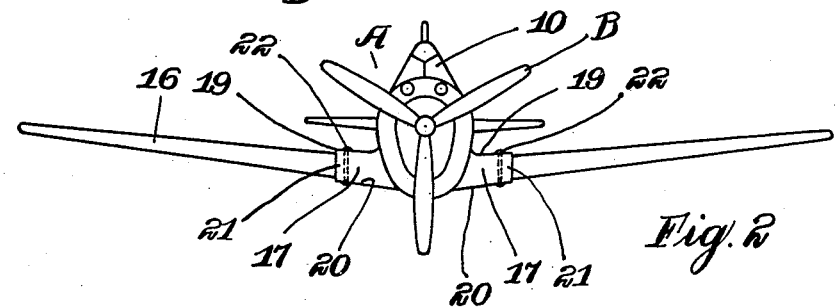
Figure 2 is a front elevation view of the airplane illustrated in Figure 1.
Figure 3:
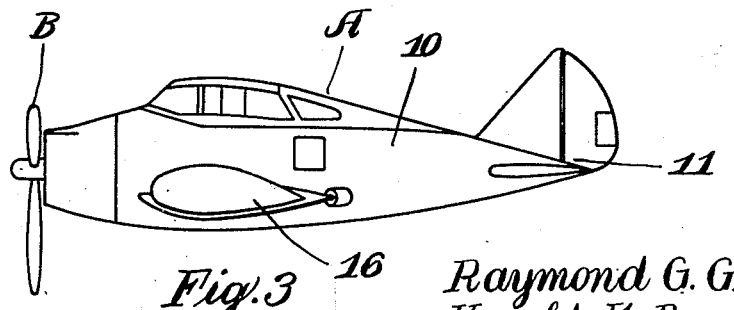
Figure 3 is a side elevation view of the airplane illustrated in Figures 1 and 2.

The airplane A may be of any desired shape or conformation, as may be desired. The airplane A includes a fuselage 10 which supports the tail assembly 11, which may be of any type. This tail asembly or tail unit includes the stabilizers 12, fin 13, rudder 14, and elevators 15. The airplane A may be powdered by any suitable form of power device which drives the propeller B.

Extending transversely from the fuselage 10, we provide supporting means for the wings 16. The wing supports illustrated are in the form of channels 17 which include upper and lower surfaces 19 and 20, respectively, and forward closed connecting surfaces 21. Pivots 22 of any desired form extend through the upper and lower surfaces 19 and 20 and through the wings 16 to attach the wings to the plane. Obviously various forms of wing supports or fittings may be employed to serve its purpose. The wings 16 in the form illustrated are provided with an outwardly inclined inner edge 23 which permits the wings 16 to pivot toward or away from the fuselage. In other words, the wing tips may pivot rearwardly, the wings swinging about the pivots 22. The wings are held in position by piston rods 24 which are pivotally attached at 25 to the inner edges 23 of the wings 16. These piston rods 24 are secured to pistons 26 which operate within cylinders 27 and 29. The cylinders 27 and 29 are provided with brackets 30 and 31 respectively, which are supported upon a vertical pivot 32. Springs 33 are interposed between the pistons 26 and the ends of the cylinders 27 and 29 most closely adjacent the brackets 30 and 31, the piston rod 24 extending through packing glands 34 to prevent oil leakage from the cylinders. Each piston rod 24 is adjustable, the rods including threaded sockets 35 in the forward ends thereof into which are threaded the shanks 36 of pivotal attaching brackets 37. The brackets 37 are pivoted to the wings at 25.

In Figure 7 of the drawings we disclose diagrammatically a control means for the wings. In this figure we disclose a cylinder 27 including the piston 26 and a pressure line 38 extending to the end of the cylinder 27 most closely adjacent the bracket 30. The pressure line 39 extends through a three way valve 40 to the pressure line 41, which includes a pressure supply tank 42. A gauge 43 of any suitable type is connected to the tank 42 so that the amount of liquid within the tank may be observed at all times. A pressure indicator 44 discloses the pressure within the tank. A manually or mechanically operated air pump 45 is connected by the pressure line 46 to the tank 42 near the top of the tank. A check valve 47 in the pressure line 46 prevents air or liquid from flowing in a reverse direction. By means of the pump 45, an air pressure may be built up above the surface of the liquid within the tank 42. The three way valve 40 is also connected by a pressure line 49 to a surge or supply tank 50. This tank is not under pressure, and a suitable vent may be provided to prevent the building up of pressure within this tank. A pressure line 51 extends from the tank 50 to a pump 52 which may be manually or mechanically operated. The pump 52 acts through the pressure line 53 to force liquid into the tank 42. A check valve 54 is provided to prevent a reverse flow of liquid in the line 53. The proper level of liquid may be maintained in the tank 42 by the pump 52. Any liquid leaking past the pistons 26 may be returned to the supply tank 50 by means of the return lines 48.

In operation the tank 42 is filled to a desired level with liquid and air pressure is created in the upper part of the tank by the pump 45. The valve 40 is in the position illustrated in Figure 7 of the drawings so that the pressure within the tank 42 is communicated to the cylinder 27. This pressure is sufficient to urge the wing 16 to the forward position illustrated in full lines in Figure 1 of the drawings, and the spring 33 assists in this action.

The combined spring and liquid pressure within the cylinder 27 is sufficient to maintain the wings in the forward position illustrated in full lines in Figure 1 during the take-off and climb of the airplane. When the airplane starts moving forwardly at a high rate of speed, however, the pressure on the leading edges of the wings increases tending to pivot the wings toward the position illustrated in dotted outline in Figure 1 of the drawings. When this pressure is sufficient to compress the springs 33 and to overcome the air pressure upon the liquid within the tank 42, the wings pivot rearwardly between the limits indicated in Figures 1 and 6. The position of the wings is thus regulated by the speed of the plane and its travel through the air.

It will be noted that by proper regulation of the pressure and by properly proportioning the liquid and air within the tank 42 any desired resistance may be provided to the pivoting of the wings. If the tank is filled above the usual level, resistance to pivoting will increase more rapidly than would otherwise be the case. The wings may be prevented from pivoting either by building up the pressure sufficiently in the tank 42 to prevent the piston 26 from moving or by closing the valve 40 which will prevent oil from being released in the cylinder 27, thereby preventing movement of the piston 26. If it is desired to allow the wings to pivot to their extreme rearward position at any time, the valve 40 may be turned to connect the pressure line 39 with the pressure line 49, whereupon the resistance to pivoting previously given by the liquid within the cylinder and the air above the liquid in the tank 42 will be released. Thus the pivoting of the wings will be resisted only by the springs 33 and the wings may readily pivot with the pressure against the leading edges thereof.

In Figure 4 of the drawings we disclose an airfoil section which is taken on a vertical plane through one of the wings parallel to the longitudinal axis of the fuselage. Figure 5 illustrates a similar section taken on the wing parallel to the longitudinal axis of the airplane after the wing has pivoted into the dotted outline position shown in Figure 1. Because of the fact that the wing has pivoted rearwardly, the airfoil section is longer than would otherwise be the case. The comparison between the usual airfoil section and the elongated airfoil section is shown in Figure 5. It will also be noted that the angle of incidence of the wing has decreased to near a zero angle of incidence. As a result, the airfoil sections will move through the air with less drag at high speeds. The reason for the fact that the angle of incidence is decreased by the pivoting of the wings is that a point on the trailing edge of the wing closer to the tip of the wing has been moved behind each point on the leading edge of the wing. Because of the dihedral angle assumed by the wings, this point on the trailing edge, which is nearer to the wing tip will also be higher than the point previously behind each point of the leading edge of the wing. Thus not only is the airfoil more aptly streamlined for higher speeds when the wings are pivoted rearwardly, but also the angle of incidence is decreased lessening the drag on the wing.

In accordance with the patent statutes, we have described the principles of construction of our airplane, and while we have endeavored to set forth the best embodiment thereof, we desire to have it understood that obvious changes may be made within the scope of the following claims without departing from the spirit of our invention.

We claim:

1. In an airplane, a fuselage, a pair of wings pivotally secured thereto along generally vertical pivot means, said wings being pivotal forwardly and rearwardly between two extreme positions, and yieldable means including a hydraulic cylinder connected at one end to said fuselage and at the other end to a wing holding said wings pivotally supported in their forward extreme positions and means controlling said hydraulic cylinder to render the same active or inactive.

2. In an airplane, a fuselage, a pair of wings pivotally secured thereto along generally vertical pivot means, said wings being pivotal forwardly and rearwardly between two extreme positions, compressible means including a hydraulic cylinder between said fuselage and each said wing urging said wings toward their forward extreme positions, and manual means for controlling said cylinder to render the same active or inactive.

3. In an airplane, a fuselage, a pair of wings pivotally secured thereto along generally vertical pivot means, said wings being pivotal forwardly and rearwardly between two extreme positions; compressible means including a hydraulic cylinder between said fuselage and each said wing urging said wings toward their forward extreme positions, manually operable means for holding said wings from pivoting rearwardly, and means for reducing the pressure holding said wings in forward extreme position.

4. In an airplane, a fuselage, a pair of wings pivotally secured thereto, retractable means including hydraulic cylinders connected at one end to said fuselage and at the other end to the respective wings holding said wings toward their extreme forward position, and means controlling said retractable means to render the same active or inactive.

RAYMOND G. GILLE.
HAROLD K. BOURQUIN.

REFERENCES CITED

The following references are of record in the file of this patent:

UNITED STATES PATENTS

| Number | Name | Date |
| --- | --- | --- |
| 2,071,513 | Evert | Feb. 23, 1937 |
| 1,290,841 | Millican | Jan. 7, 1919 |
| 1,674,177 | Nyakas | June 19, 1928 |
| 1,018,413 | Dunton | Feb. 27, 1912 |
| 1,879,618 | Icre | Sept. 27, 1932 |
| 2,026,728 | Barnhart | Jan. 7, 1936 |
| 2,272,664 | Gropler | Feb. 10, 1942 |
| 1,009,770 | McKenzie | Nov. 28, 1911 |
| 1,740,016 | Hubschman | Dec. 17, 1929 |
| 1,750,778 | Kay | Mar. 18, 1930 |
| 1,025,063 | Hubschman | Apr. 30, 1912 |

FOREIGN PATENTS

| Number | Country | Date |
| --- | --- | --- |
| 484,622 | Great Britain | May 9, 1938 |
| 526,162 | Great Britain | Sept. 12, 1940 |
| 30,344 | Great Britain | 1909 |